(12) United States Patent
Reedy

(10) Patent No.: US 12,548,990 B2
(45) Date of Patent: Feb. 10, 2026

(54) ELECTRICAL BUS BAR ASSEMBLY

(71) Applicant: Aptiv Technologies AG, Schauffhausen (CH)

(72) Inventor: Patrick Reedy, Youngstown, OH (US)

(73) Assignee: Aptiv Technologies AG, Schaffhausen (CH)

( * ) Notice: Subject to any disclaimer, the term of this patent is extended or adjusted under 35 U.S.C. 154(b) by 431 days.

(21) Appl. No.: 18/134,319

(22) Filed: Apr. 13, 2023

(65) Prior Publication Data

US 2023/0344209 A1    Oct. 26, 2023

Related U.S. Application Data

(60) Provisional application No. 63/334,330, filed on Apr. 25, 2022.

(51) Int. Cl.
*H01R 25/16* (2006.01)
*H01R 4/52* (2006.01)
*H02G 5/00* (2006.01)

(52) U.S. Cl.
CPC ............... *H02G 5/002* (2013.01); *H01R 4/52* (2013.01); *H01R 25/162* (2013.01)

(58) Field of Classification Search
CPC .............. H01R 13/2464; H01R 25/145; H01R 25/162; H01R 25/16; H01R 4/4809; H01R 4/52; H02G 5/002; H02G 5/00

USPC ......................................... 174/68.2; 439/121
See application file for complete search history.

(56) References Cited

U.S. PATENT DOCUMENTS

| 1,967,340 | A |   | 7/1934 | Splunter | |
|---|---|---|---|---|---|
| 2,831,071 | A |   | 4/1958 | Taylor | |
| 6,145,945 | A | * | 11/2000 | Parvin | A47B 88/493 312/334.17 |
| 6,198,396 | B1 | * | 3/2001 | Frank | G08B 21/0446 340/689 |
| 2019/0288467 | A1 | * | 9/2019 | Mastrovito | H01R 4/4881 |

FOREIGN PATENT DOCUMENTS

DE        102017217288 A1 *  3/2019  .............. F16F 9/029

* cited by examiner

*Primary Examiner* — Timothy J Thompson
*Assistant Examiner* — Guillermo J Egoavil
(74) *Attorney, Agent, or Firm* — Billion & Armitage

(57) ABSTRACT

An electrical bus bar assembly includes a first bus bar segment, a second bus bar segment separated from the first bus bar segment, and a first plurality of bearings formed of an electrically conductive material and in electrical contact with the first bus bar segment and the second bus bar segment. The first plurality of bearings is configured to allow the first bus bar segment to move relative to the second bus bar segment. A method of manufacturing such an electrical bus bar assembly is also provided.

19 Claims, 5 Drawing Sheets

ELECTRICAL BUS BAR ASSEMBLY

CROSS-REFERENCE TO RELATED APPLICATION

This application claims benefit of priority to U.S. Provisional Patent Application No. 63/334,330 filed on May 24, 2022, and to U.S. Provisional Patent Application No. 63/334,330 filed on Apr. 24, 2022, the entire disclosure of each of which is hereby incorporated by reference.

TECHNICAL FIELD

This invention generally relates to an electrical bus bar assembly.

BACKGROUND

Electrical bus bars may be used in place of electrical wires in high current applications, such as providing electrical power between a battery pack and a motor in an electrical vehicle. Resistive loses in the bus bar can generate heat which causes thermal expansion of the bus bars. The thermal expansion may lead to dimensional changes in the bus bars that can cause them to exceed their packaging envelope. The thermal expansion and accompanying thermal contraction when the bus bars are no longer conducting current can cause material fatigue in the bus bars and fretting corrosion of terminal interfaces with the bus bars.

Prior solutions applied to the problems caused by bus bar thermal expansion have included addition of flexible sections in the bus bar in the form of bowed sections, flat braided copper cables, or conventional round copper cable along the length of the bus bar to accommodate dimensional changes caused by bus bar temperature changes and prevent the effects of thermal expansion from inducing fretting corrosion.

SUMMARY

According to one or more aspects of the present disclosure, a bus bar assembly includes a first bus bar segment, a second bus bar segment separated from the first bus bar segment, and a first plurality of bearings formed of an electrically conductive material and in electrical contact with the first bus bar segment and the second bus bar segment. The first plurality of bearings is configured to allow the first bus bar segment to move relative to the second bus bar segment.

In one or more embodiments of the bus bar assembly according to the previous paragraph, the bus bar assembly further includes a bearing retainer configured to maintain alignment of the first plurality of bearings.

In one or more embodiments of the bus bar assembly according to any one of the previous paragraphs, the first plurality of bearings contains roller bearings arranged in a parallel alignment and the bearing retainer is configured to maintain the parallel alignment of the roller bearings.

In one or more embodiments of the bus bar assembly according to any one of the previous paragraphs, the first plurality of bearings contains ball bearings arranged in an array and the bearing retainer is configured to maintain a distance between the ball bearings in the array.

In one or more embodiments of the bus bar assembly according to any one of the previous paragraphs, the bus bar assembly further includes a clamp having a spring member disposed within the clamp. The spring member is configured to apply a normal force to the first bus bar segment, the second bus bar segment, and the first plurality of bearings.

In one or more embodiments of the bus bar assembly according to any one of the previous paragraphs, the clamp is affixed to the second bus bar segment.

In one or more embodiments of the bus bar assembly according to any one of the previous paragraphs, the first bus bar segment is configured to move within the clamp in a direction parallel to the second bus bar segment.

In one or more embodiments of the bus bar assembly according to any one of the previous paragraphs, the bus bar assembly further includes a second plurality of bearings disposed between the spring member and the first bus bar segment.

In one or more embodiments of the bus bar assembly according to any one of the previous paragraphs, the second plurality of bearings is formed of a material having a lower electrical conductivity than the electrically conductive material forming the first plurality of bearings.

In one or more embodiments of the bus bar assembly according to any one of the previous paragraphs, the first plurality of bearings is formed of a tin-plated copper-based material.

In one or more embodiments of the bus bar assembly according to any one of the previous paragraphs, the bus bar assembly further includes an electrically insulative housing surrounding the first plurality of bearings, a portion of the first bus bar segment, and a portion of the second bus bar segment.

According to one or more aspects of the present disclosure, a bus bar assembly includes a first bus bar segment, a second bus bar segment in mechanical and electrical contact with the first bus bar segment and a clamp having a spring member disposed within the clamp. The spring member is configured to apply a normal force to the first bus bar segment and the second bus bar segment. The bus bar assembly also includes a sealed electrically insulative housing surrounding the clamp, a portion of the first bus bar segment, and a portion of the second bus bar segment and a lubricant disposed within the sealed electrically insulative housing.

In one or more embodiments of the bus bar assembly according to the previous paragraph, the lubricant is an electrically conductive lubricant.

According to one or more aspects of the present disclosure, a method of manufacturing an electrical bus bar assembly includes placing a first plurality of bearings formed of an electrically conductive material within a bearing retainer configured to maintain alignment of the first plurality of bearings and placing the first plurality of bearings in electrical contact with a first bus bar segment and a second bus bar segment separated from the first bus bar segment. The first plurality of bearings is configured to allow the first bus bar segment to move relative to the second bus bar segment.

In one or more embodiments of the method according to the previous paragraph, the method further includes attaching a clamp to the second bus bar segment and applying a normal force to the first bus bar segment the second bus bar segment, and the first plurality of bearings via a spring member within the clamp.

In one or more embodiments of the method according to any one of the previous paragraphs, the first bus bar segment is configured to move within the clamp in a direction parallel to a longitudinal axis of the second bus bar segment.

In one or more embodiments of the method according to any one of the previous paragraphs, the method further includes disposing a second plurality of bearings between the spring member and the first bus bar segment.

In one or more embodiments of the method according to any one of the previous paragraphs, the method further includes attaching a sealed electrically insulative housing to the electrical bus bar assembly such that it surrounds the first plurality of bearings, a portion of the first bus bar segment, and a portion of the second bus bar segment.

In one or more embodiments of the method according to any one of the previous paragraphs, the method further includes applying an electrically conductive lubricant within the sealed electrically insulative housing.

In one or more embodiments of the method according to any one of the previous paragraphs, the first plurality of bearings is formed of a tin-plated copper-based material.

BRIEF DESCRIPTION OF THE DRAWINGS

The present invention will now be described, by way of example with reference to the accompanying drawings, in which.

DETAILED DESCRIPTION

This patent application is directed to an electrical bus bar assembly that includes a thermal expansion joint.

Figure 1:
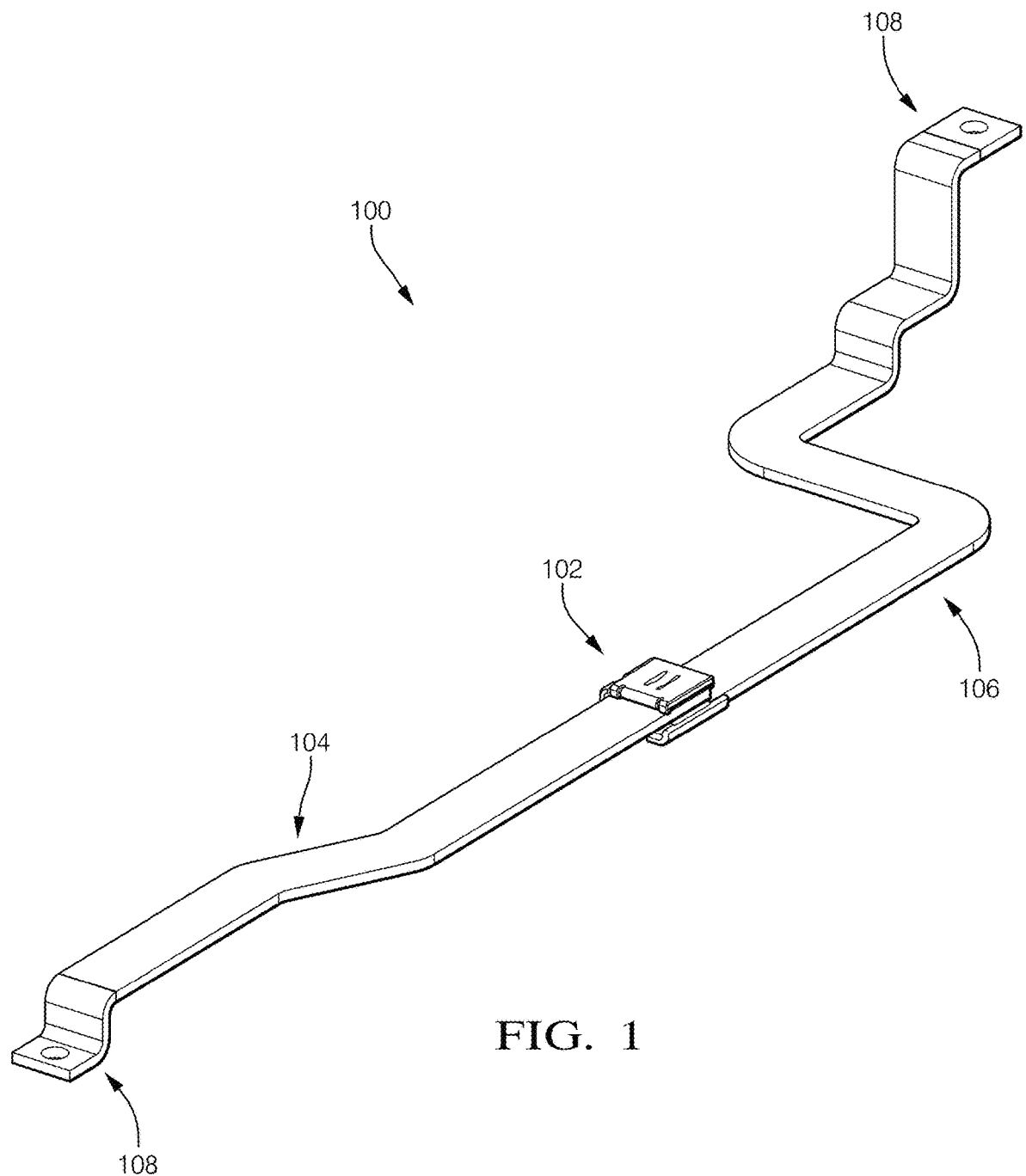
FIG. 1 shows an electrical bus bar with an expansion joint according to some embodiments.
Figure 2:
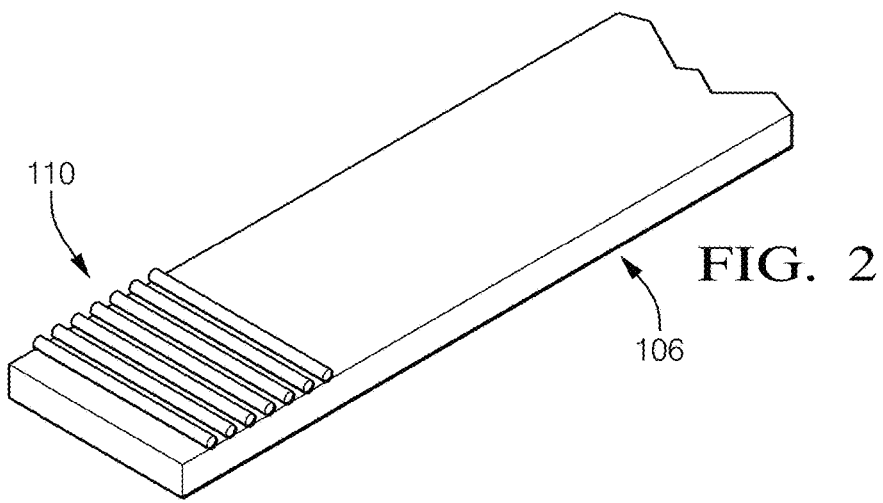
FIGS. 2 to 6 show an assembly sequence for the expansion joint of the electrical bus bar of FIG. 1 according to some embodiments.
Figure 4:
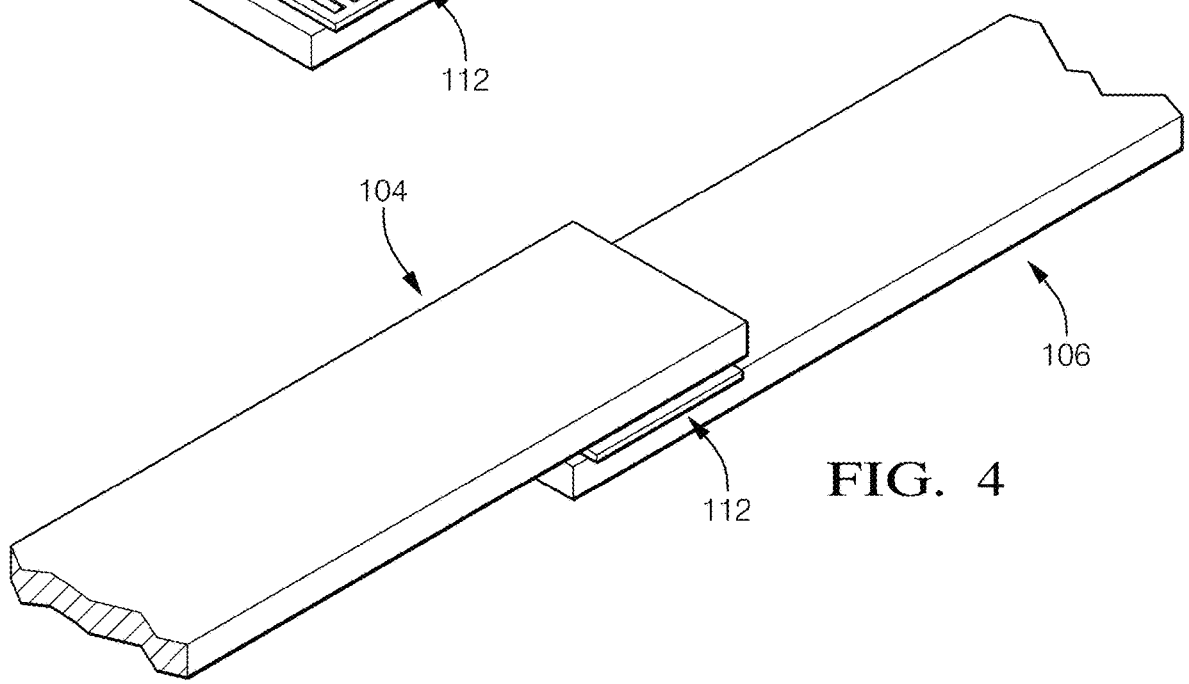

The non-limiting example of a bus bar assembly 100 shown in FIG. 1 includes a thermal expansion joint that is contained within a housing 102, preferably an electrically non-conductive housing. The bus bar of the bus bar assembly is divided into a first bus bar segment 104 that is separate from a second bus bar segment 106. In the thermal expansion joint, portions of the first and second bus bar segments 104, 106 overlap each other as shown in FIG. 4. The other ends of the first and second bus bar segments have terminals 108 to attach the bus bar assembly 100 to other circuit elements (not shown). The thermal expansion joint also includes a first plurality of bearings 110 that are formed of an electrically conductive material (see FIG. 2) and are disposed between the end portions of the first and second bus bar segments 104, 106 (see FIG. 4). The first plurality of bearings 110 is in mechanical and electrical contact with the first bus bar segment 104 and the second bus bar segment 106. The first plurality of bearings 110 is configured to allow the first bus bar segment 104 to move relative to the second bus bar segment 106 with a very low coefficient of friction.

Figure 3:
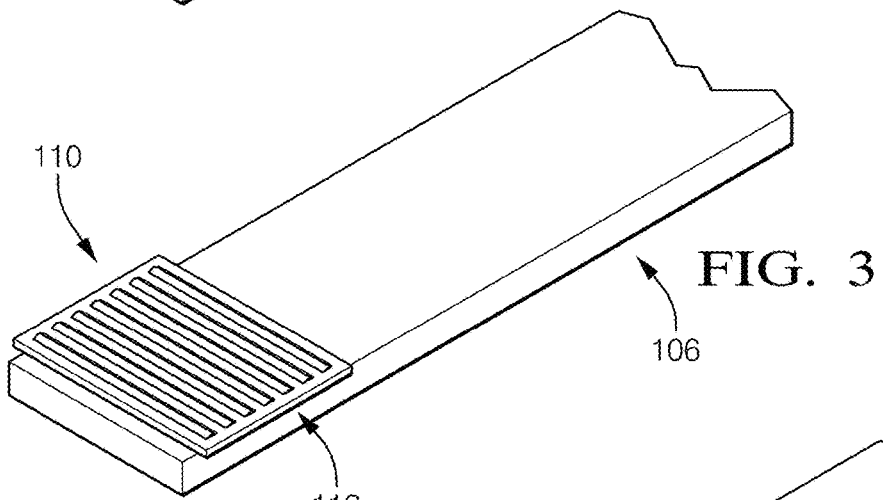

The thermal expansion joint of the bus bar assembly 100 further includes a bearing retainer 112 that is configured to maintain alignment of the first plurality of bearings 110 (see FIG. 3). In the illustrated example, the first plurality of bearings 110 contains roller bearings that are arranged in a parallel alignment. The bearing retainer 112 is configured to maintain the parallel alignment of the roller bearings. In a preferred embodiment, the first plurality of bearings 110 may preferably contain 7 to 10 roller bearings. The roller bearings may be cylindrical pins or needles made of a tin-plated, copper-based material. In other embodiments, the bearings may be plated with copper, gold, nickel, or other suitable plating materials. Typically, roller bearings are used for applications having a high normal force, i.e., over 500 newtons, therefore the material used for manufacturing these roller bearings is usually selected for its high strength properties. However, the normal forces applied to the roller bearings in the bus bar assembly is in the range of 70 to 90 newtons and so the material used for the roller bearings may be selected to optimize electrical conductivity of the roller bearings.

In other embodiments of the bus bar assembly, the first plurality of bearings may include other types of bearings, such as ball bearings arranged in a bearing retainer that arranges the ball bearings in an array. In this embodiment, the bearing retainer is configured to maintain alignment and distance between the ball bearings in the array. The ball bearings may be made of a tin-plated, copper-based material. In other embodiments, the bearings may be plated with copper, gold, nickel, or other suitable plating materials.

Figure 5:
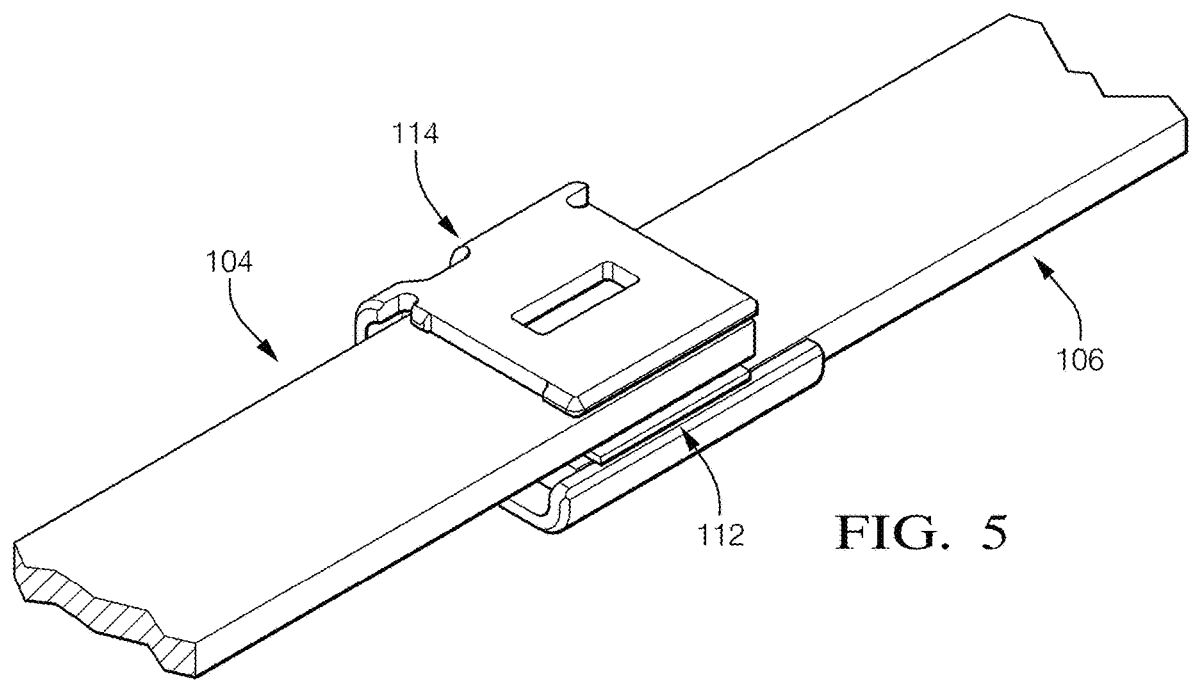
Figure 6:
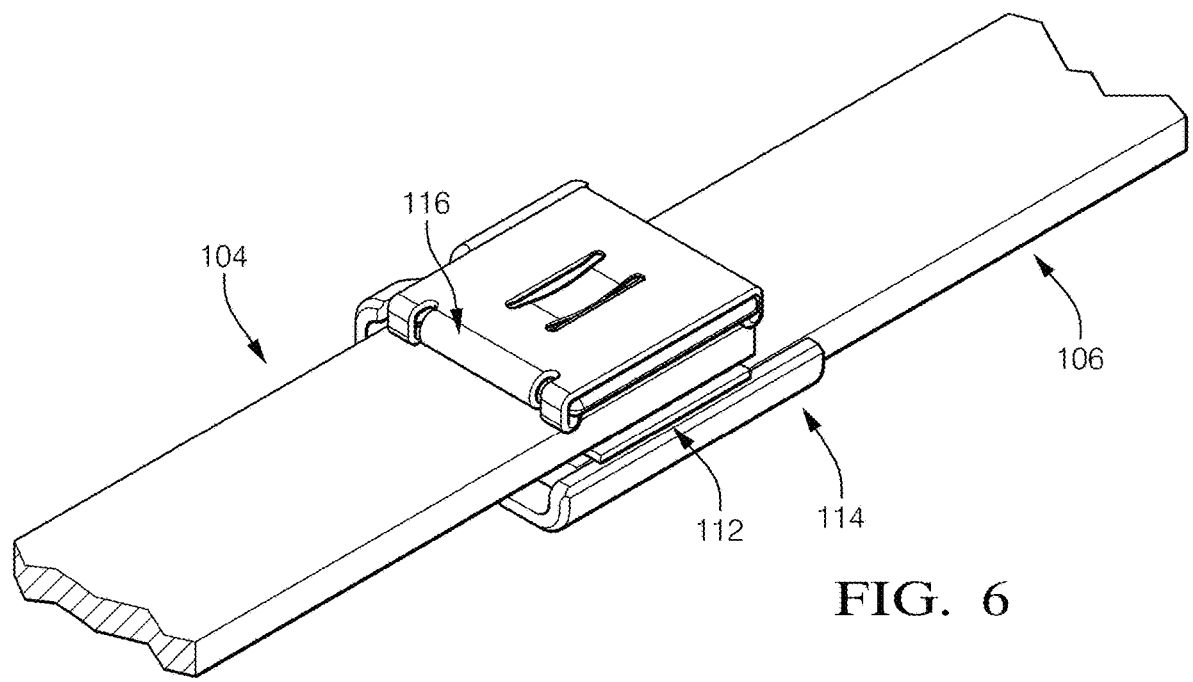

The thermal expansion joint of the bus bar assembly 100 also includes a clamp 114 (see FIG. 5) having a spring member 116 (see FIG. 6) disposed within the clamp 114. The spring member 116 is configured to apply a normal force to the first bus bar segment 104, the second bus bar segment 106, and the first plurality of bearings 110. The first bus bar segment 104 is configured to move within the clamp 114 in a direction parallel to the second bus bar segment 106. The joint formed between the first and second bus bar segments 104, 106 by the first plurality of bearings 110 and the clamp 114 also provides some freedom of movement in two other orthogonal axes, e.g., lateral and vertical. The spring member 116 is preferably a leaf spring or a cantilevered arcuate spring but may be a coil spring, or any other type of spring suitable for applying the normal force. In the illustrated example, the clamp 114 is affixed to the second bus bar segment 106 and so the second bus bar segment 106 is not configured to move longitudinally relative to the clamp 114.

In alternative embodiments, the clamp may not be fixed to the second bus bar segment, but instead held in place by the normal force from the spring member.

In other alternative embodiments, the electrical bus bar assembly may also include a second plurality of bearings that are positioned between the spring member and the first bus bar segment. This second plurality of bearings may be configured to reduce wear caused by friction between the spring member and the first bus bar segment. The second plurality of bearings may be formed of a material having a lower electrical conductivity than the electrically conductive material forming the first plurality of bearings since the primary conductive path may be between the first and second bus bar segments is through the first plurality of beatings rather than through the second plurality of bearings and clamp. The lower conductivity of the clamp also results in a more consistent normal force since the clamp and spring experience less heating due to current flow through the clamp that would cause a relaxation of the normal force.

Figure 8:
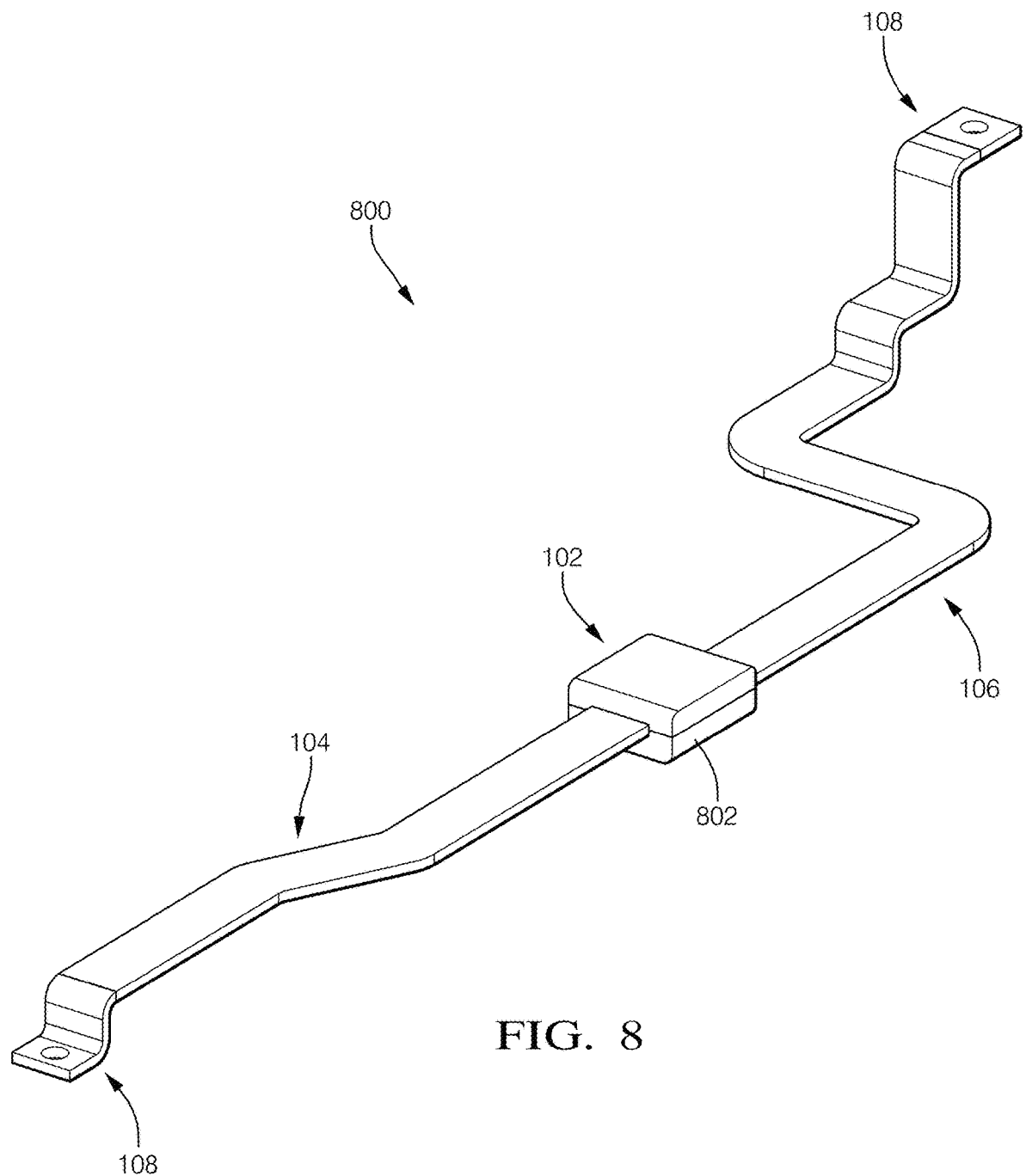
FIG. 8 shows an electrical bus bar with an expansion joint according to some embodiments.

In the electrical bus bar assembly 800 shown in FIG. 8, the first and second bus bar segments 104, 106 may be in direct mechanical and electrical contact. A clamp 102 having a spring member(s) disposed between the clamp 102 and one or both of the first and second bus bar segments 104, 106 is configured to apply a normal force to the first bus bar segment 104 and the second bus bar segment 106. A sealed electrically insulative housing 802 surrounds the clamp 102, a portion of the first bus bar segment 104, and a portion of the second bus bar segment 106. A lubricant is disposed within the sealed electrically insulative housing 802 to allow the first and second bus bar segments 104, 106 to move relative to one another while minimizing wear of the ends of the first and second bus bar segments 104, 106. The lubricant may be an electrically conductive lubricant, e.g., a silicone lubricant filled with carbon or silver particles or other lubricant designed for use with electrical contacts. Alternatively, the lubricant may be electrically nonconductive. Nonconductive lubricants both reduce friction and protect the interfacing materials from oxidation, thereby extending the service life of the electrical bus bar assembly 800.

Figure 7:
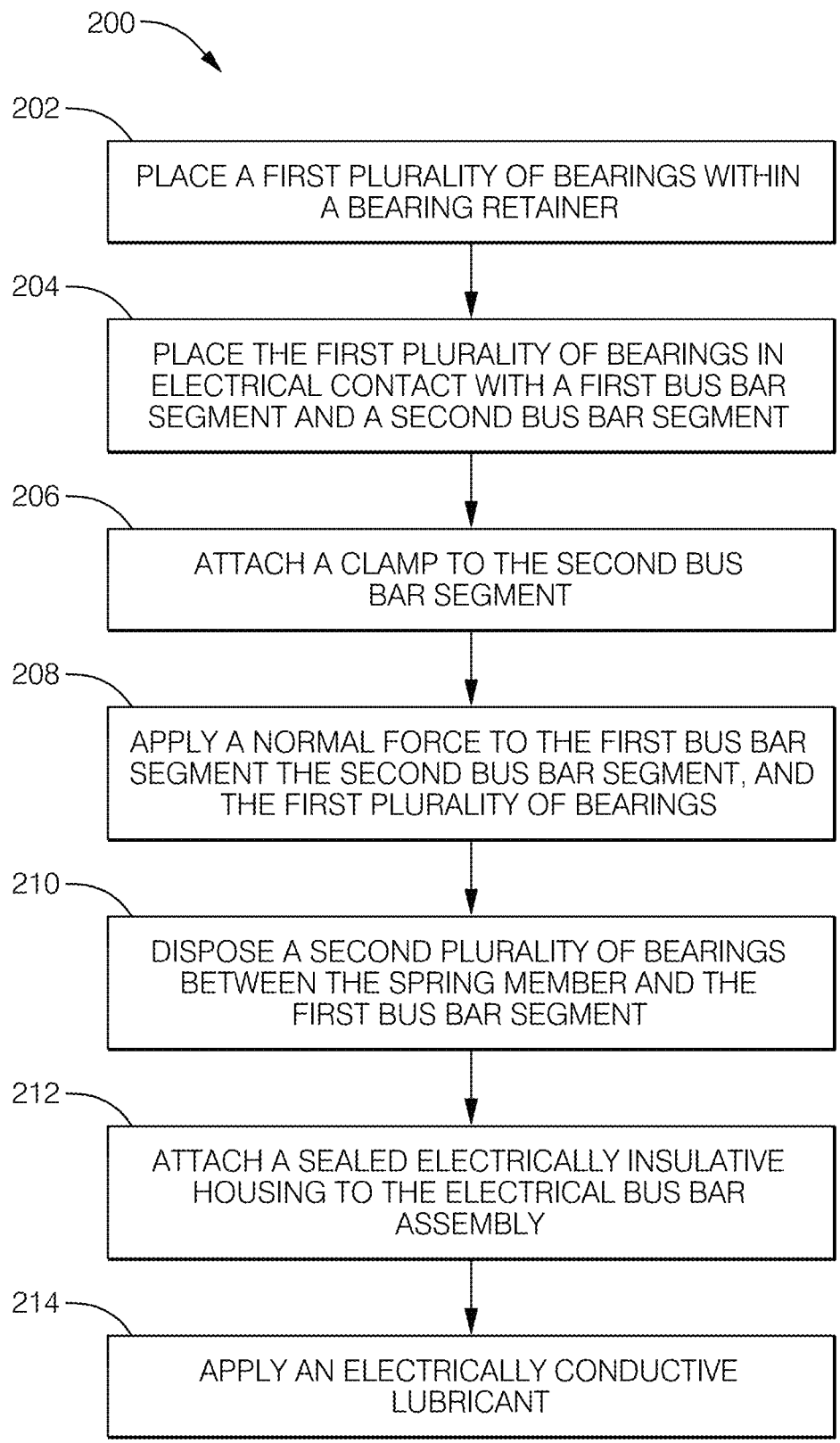
FIG. 7 shows a flow chart of a method of manufacturing an electrical bus bar, such as the one shown in FIG. 1, according to some embodiments.

A method 200 of manufacturing an electrical bus bar assembly 100 is shown in FIG. 7. The method 200 includes the steps of:

STEP 202, PLACE A FIRST PLURALITY OF BEARINGS WITHIN A BEARING RETAINER, includes placing a first plurality of bearings 110 formed of an electrically conductive material within a bearing retainer 112 configured to maintain alignment of the first plurality of bearings 110. The first plurality of bearings 110 may be formed of a tin-plated copper-based material;

STEP 204, PLACE THE FIRST PLURALITY OF BEARINGS IN ELECTRICAL CONTACT WITH A FIRST BUS BAR SEGMENT AND A SECOND BUS BAR SEGMENT, includes placing the first plurality of bearings 110 in electrical contact with a first bus bar segment 104 and a second bus bar segment 106 separated from the first bus bar segment 104. The first plurality of bearings 110 is configured to allow the first bus bar segment 104 to move relative to the second bus bar segment 106;

STEP 206, ATTACH A CLAMP TO THE SECOND BUS BAR SEGMENT, includes attaching a clamp 114 to the second bus bar segment 106;

STEP 208, APPLY A NORMAL FORCE TO THE FIRST BUS BAR SEGMENT THE SECOND BUS BAR SEGMENT, AND THE FIRST PLURALITY OF BEARINGS, includes applying a normal force to the first bus bar segment 104, the second bus bar segment 106, and the first plurality of bearings 110 via a spring member 116 within the clamp 114. The first bus bar segment 104 may be configured to move within the clamp 114 in a direction parallel to a longitudinal axis X of the second bus bar segment 106;

STEP 210, DISPOSE A SECOND PLURALITY OF BEARINGS BETWEEN THE SPRING MEMBER AND THE FIRST BUS BAR SEGMENT, includes disposing a second plurality of bearings between the spring member 116 and the first bus bar segment 104;

STEP 212, ATTACH A SEALED ELECTRICALLY INSULATIVE HOUSING TO THE ELECTRICAL BUS BAR ASSEMBLY, includes attaching a sealed electrically insulative housing 102 to the electrical bus bar assembly 100 such that it surrounds the first plurality of bearings 110, a portion of the first bus bar segment 104, and a portion of the second bus bar segment 106; and STEP 214, APPLY AN ELECTRICALLY CONDUCTIVE LUBRICANT, includes applying an electrically conductive lubricant within the sealed electrically insulative housing 102.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An electrical bus bar assembly, comprising:
a first bus bar segment;
a second bus bar segment separated from the first bus bar segment;
a first plurality of bearings formed of an electrically conductive material and in electrical contact with the first bus bar segment and the second bus bar segment, the first plurality of bearings contains roller bearings arranged in a parallel alignment, the first plurality of bearings is configured to allow the first bus bar segment to move relative to the second bus bar segment; and a bearing retainer configured to maintain alignment of the first plurality of bearings, the bearing retainer is further configured to maintain the parallel alignment of the roller bearings.

2. The electrical bus bar assembly in accordance with claim 1, wherein the first plurality of bearings contains ball bearings arranged in an array and the bearing retainer is configured to maintain a distance between the ball bearings in the array.

3. The electrical bus bar assembly in accordance with claim 1, further comprising a clamp having a spring member disposed within the clamp and wherein the spring member is configured to apply a normal force to the first bus bar segment, the second bus bar segment, and the first plurality of bearings.

4. The electrical bus bar assembly in accordance with claim 3, wherein the clamp is affixed to the second bus bar segment.

5. The electrical bus bar assembly in accordance with claim 3, wherein the first bus bar segment is configured to move within the clamp in a direction parallel to the second bus bar segment.

6. The electrical bus bar assembly in accordance with claim 1, wherein the first plurality of bearings is formed of a tin-plated copper-based material.

7. The electrical bus bar assembly in accordance with claim 1, further comprising an electrically insulative housing surrounding the first plurality of bearings, a portion of the first bus bar segment, and a portion of the second bus bar segment.

8. The electrical bus bar assembly of claim 3, wherein the spring member applies a normal force in the range of 70 to 90 newtons.

9. The electrical bus bar assembly of claim 3, wherein the first plurality of bearings and the clamp are configured to permit movement of the first bus bar segment relative to the second bus bar segment in at least two orthogonal directions.

10. An electrical bus bar assembly, comprising:
   a first bus bar segment;
   a second bus bar segment separated from the first bus bar segment; and
   a first plurality of bearings formed of an electrically conductive material and in electrical contact with the first bus bar segment and the second bus bar segment, wherein the first plurality of bearings is configured to allow the first bus bar segment to move relative to the second bus bar segment;
   a clamp having a spring member disposed within the clamp and wherein the spring member is configured to apply a normal force to the first bus bar segment, the second bus bar segment, and the first plurality of bearings; and
   a second plurality of bearings disposed between the spring member and the first bus bar segment.

11. The electrical bus bar assembly in accordance with claim 10, further comprising a bearing retainer configured to maintain alignment of the first plurality of bearings.

12. The electrical bus bar assembly in accordance with claim 11, wherein the first plurality of bearings contains roller bearings arranged in a parallel alignment and the bearing retainer is configured to maintain the parallel alignment of the roller bearings.

13. The electrical bus bar assembly in accordance with claim 10, the second plurality of bearings is formed of a material having a lower electrical conductivity than the electrically conductive material forming the first plurality of bearings.

14. The electrical bus bar assembly in accordance with claim 10, wherein the first plurality of bearings is formed of a tin-plated copper-based material.

15. The electrical bus bar assembly in accordance with claim 10, further comprising an electrically insulative housing surrounding the first plurality of bearings, a portion of the first bus bar segment, and a portion of the second bus bar segment.

16. The electrical bus bar assembly of claim 10, wherein the spring member applies a normal force in the range of 70 to 90 newtons.

17. The electrical bus bar assembly of claim 10, wherein the first and second plurality of bearings and the clamp are configured to permit movement of the first bus bar segment relative to the second bus bar segment in at least two orthogonal directions.

18. An electrical bus bar assembly, comprising:
   a first bus bar segment;
   a second bus bar segment in mechanical and electrical contact with the first bus bar segment;
   a clamp having a spring member disposed within the clamp and wherein the spring member is configured to apply a normal force to the first bus bar segment and the second bus bar segment;
   a sealed electrically insulative housing surrounding the clamp, a portion of the first bus bar segment, and a portion of the second bus bar segment; and
   a lubricant disposed within the sealed electrically insulative housing.

19. The electrical bus bar assembly in accordance with claim 18, wherein the lubricant is an electrically conductive lubricant.

* * * * *